W. H. A. R. WEDEMEYER.
DUST CHUTE.
APPLICATION FILED JULY 2, 1912.

1,079,529.

Patented Nov. 25, 1913.

2 SHEETS—SHEET 1.

Witnesses
Daniel Holmgren.
Katheryne Koch.

Inventor
Wilhelm Heinrich August Robert Wedemeyer
By Briesen & Knauth
Att's.

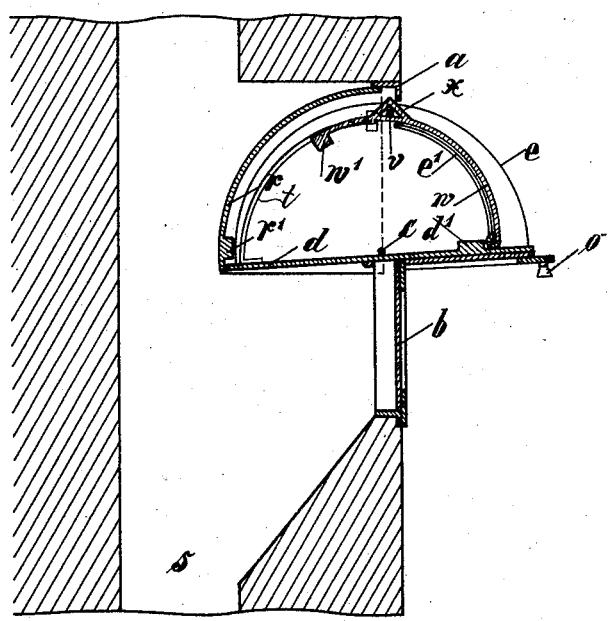
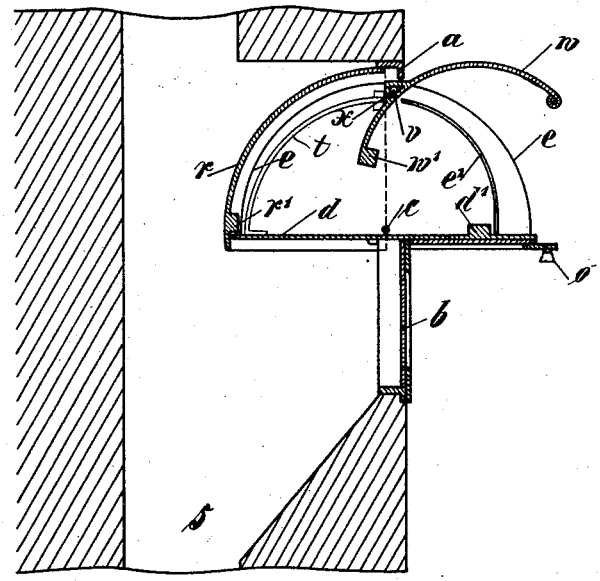

UNITED STATES PATENT OFFICE.

WILHELM HEINRICH AUGUST ROBERT WEDEMEYER, OF HAMBURG, GERMANY.

DUST-CHUTE.

1,079,529.  Specification of Letters Patent.  Patented Nov. 25, 1913.

Application filed July 2, 1912. Serial No. 707,398.

*To all whom it may concern:*

Be it known that I, WILHELM HEINRICH AUGUST ROBERT WEDEMEYER, a subject of the German Emperor, and resident of Hamburg, Germany, have invented a new and useful Dust-Chute, of which the following is a specification.

This invention relates to a novel device, by means of which ashes, dust or other house refuse may be dumped into a chute, while the mouth thereof is closed, so as to prevent an objectionable whirling of dust into the room.

The device consists essentially of a trough-like receptacle which is tiltably mounted in a frame set into the chute. The closure for this trough is so arranged that the latter when tilted in one direction and opened in front to permit the reception of an ash can, etc., is closed on the dust chute side, whereas when the ashes are dumped, the mouth of the chute is closed by the trough itself, thereby preventing any of the dust from escaping.

Figure 1:
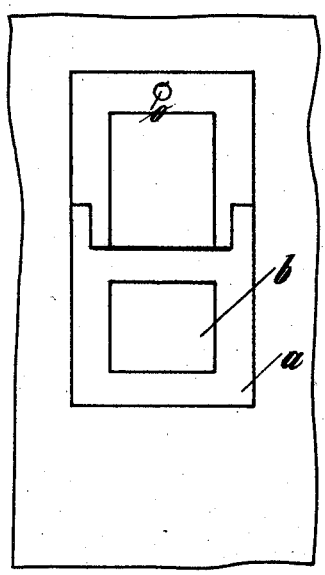
Figure 3:
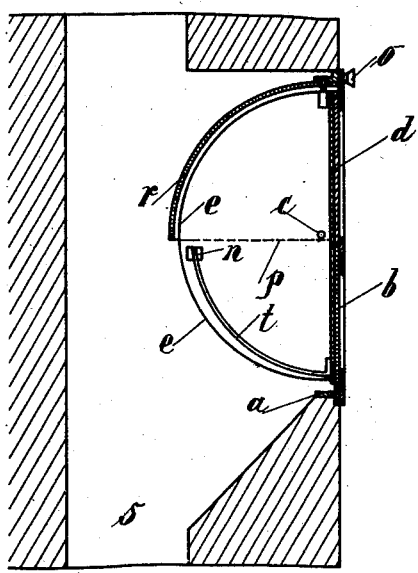
Figure 2:
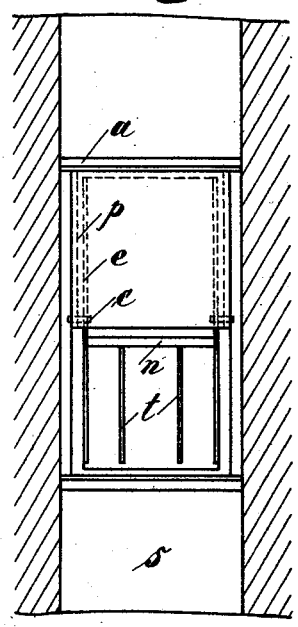
Figure 4:
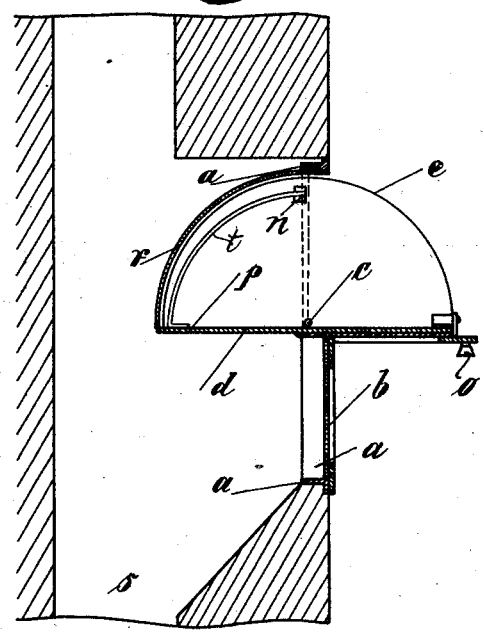

In the accompanying drawing: Figure 1 is a front view of a dust chute embodying my invention; Fig. 2 a vertical section thereof; Fig. 3 a vertical section at right angles to Fig. 2, showing the device closed; Fig. 4 a similar section showing the device open; Fig. 5 a vertical section through a modification of the dust chute, and Fig. 6 a similar section showing the parts in a different position.

The device consists of an angle-iron frame $a$ tightly fitted into a corresponding opening formed in the front wall of the dust chute $s$, the lower portion of said frame being closed by a plate $b$. On pivots $c$ of frame $a$, is tiltably mounted a trough consisting of a bottom plate $d$ and a pair of semicircular side plates $e$. To the upper portion of frame $a$, is secured a hood consisting of a curved rear wall $r$ and a pair of quadrantal side plates $p$ which flank the sides $e$ of the trough. To plate $d$ is secured a plurality of curved grid bars $t$, the free ends of which are by a transverse bar $n$ connected to sides $e$. When not in use the trough occupies such a position that its bottom plate $d$ extends in a vertical direction and rests against frame 10, to thus close the chute mouth (Fig. 3). When the chute is to be used, the trough is tilted by knob $o$, until its bottom plate $d$ occupies a horizontal position, which movement is limited by the engagement of said bottom plate with the lower edge of wall $r$ (Fig. 4). In this position the chute $s$ is tightly closed against the room from which the ashes, etc., are to be removed. The ash can is now placed upon the outwardly projecting portion of plate $d$, whereupon the trough is tilted into the position shown in Fig. 3. In this way, the can is emptied while the grid bars $t$ prevent the same from falling out of the trough. While the ashes descend within the chute, the latter is shut off from the room by the trough plate $d$, so that dust is prevented from escaping.

With the construction shown in Figs. 5 and 6, the side walls $e$ of the tiltable trough are provided with pivots $v$ upon which turns a curved cover or lid $w$. This cover is provided with a projection $x$ which when the trough has been swung outward from the mouth of the dust chute, strikes against the upper part of the frame $a$ causing the cover to turn about its pivots $v$ as soon as the trough has approximately reached its horizontal position. As soon therefore as the trough has reached its extreme forward position, the cover $w$ has been raised sufficiently off plate $d$ to render the trough accessible from the front. The side walls $e$ are provided with ribs $e^1$ and the floor-plate $d$ is provided with a strip $d^1$ which makes a tight joint with the lower edge of the cover $w$. The cover is provided with a counterweight $w^1$ which approximately counterbalances the weight thereof. The tilting movement of the trough is limited by a rib $r^1$ arranged on the inner side of the hood wall $r$ which engages with the rear end of the trough as soon as the latter reaches its horizontal position. When the trough is returned to its original or closed position, the projection $x$ on the cover $w$ clears the frame $a$, so that the cover closes the trough in front before the rear end of the floor $d$ clears the end of the hood wall $r$. In this way, the interior of the dust chute is completely shut off from the dwelling room from the commencement to the end of the turning movement of the tilting trough.

I claim:

1. A device of the character described, comprising a chute having an inlet opening, a frame fitted into said opening, a trough pivoted at its center to the frame and being composed of a bottom plate and a pair of semicircular side plates, curved grid bars within the trough, and a hood composed of a curved rear wall and a pair of quadrantal side plates that flank the trough sides, said hood constituting an abutment for said trough when swung into a horizontal position, whereby the inlet is closed against the chute.

2. A device of the character described, comprising a chute having an inlet opening, a frame fitted into said opening, a trough pivoted at its center to the frame and being composed of a bottom plate and a pair of semicircular side plates, a counterweighted lid fulcrumed to said side plates and having a projection adapted to engage the frame, and a hood extending into the chute and straddling the trough, said hood constituting an abutment for said trough when swung into a horizontal position, whereby the inlet is closed against the chute.

Signed by me at Hamburg this 19th day of June 1912.

WILHELM HEINRICH AUGUST
ROBERT WEDEMEYER.

Witnesses:
AUGUST WENK,
ERNEST H. L. MUMMENHOFF.

Copies of this patent may be obtained for five cents each, by addressing the "Commissioner of Patents, Washington, D. C."